US009892092B2

(12) United States Patent
Stern et al.

(10) Patent No.: US 9,892,092 B2
(45) Date of Patent: *Feb. 13, 2018

(54) AUTOMATIC GENERATION OF ASSENT INDICATION IN A DOCUMENT APPROVAL FUNCTION FOR COLLABORATIVE DOCUMENT EDITING

(71) Applicant: International Business Machines Corporation, Armonk, NY (US)

(72) Inventors: Edith H. Stern, Yorktown Heights, NY (US); Robert C. Weir, Westford, MA (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 322 days.

This patent is subject to a terminal disclaimer.

(21) Appl. No.: 14/855,378

(22) Filed: Sep. 16, 2015

(65) Prior Publication Data

US 2016/0004670 A1 Jan. 7, 2016

Related U.S. Application Data

(63) Continuation of application No. 12/362,222, filed on Jan. 29, 2009, now Pat. No. 9,165,262.

(51) Int. Cl.
| | | |
|---|---|---|
| *G06F 17/24* | (2006.01) | |
| *G06F 17/21* | (2006.01) | |
| *G06Q 10/00* | (2012.01) | |
| *G06Q 10/10* | (2012.01) | |
| *G06F 3/0481* | (2013.01) | |

(52) U.S. Cl.
CPC ........ *G06F 17/212* (2013.01); *G06F 3/04817* (2013.01); *G06F 17/211* (2013.01); *G06Q 10/00* (2013.01); *G06Q 10/10* (2013.01)

(58) Field of Classification Search
CPC ..................................... G06F 17/211
See application file for complete search history.

(56) References Cited

U.S. PATENT DOCUMENTS

| | | | | |
|---|---|---|---|---|
| 4,981,370 A | * | 1/1991 | Dziewit | H04L 9/3247 340/5.86 |
| 5,031,214 A | * | 7/1991 | Dziewit | H04L 9/3247 713/176 |
| 5,191,613 A | * | 3/1993 | Graziano | G06F 21/645 340/5.86 |
| 7,302,674 B1 | * | 11/2007 | Gladieux | G06Q 10/06 707/999.104 |
| 7,319,986 B2 | | 1/2008 | Praisner et al. | |
| 7,340,673 B2 | * | 3/2008 | Malone | G06F 17/214 715/234 |
| 7,363,579 B2 | * | 4/2008 | Vasey | G06F 17/218 715/256 |

(Continued)

*Primary Examiner* — Mohammed-Ibrahim Zuberi

(74) *Attorney, Agent, or Firm* — Steven M. Greenberg, Esq.; CRGO Law

(57) ABSTRACT

A method for generating an assent indication in a document approval and review function can include loading a document for editing in a document editor and determining a set of authors for the document. The method also can include modifying a title of the document to include an identity of at least one of the authors in the set. Finally, the method can include changing a visual appearance in the title of an identity of the assenting author responsive to one of the authors in the set assenting to a publication of the document.

17 Claims, 2 Drawing Sheets

(56) References Cited

U.S. PATENT DOCUMENTS

| | | | |
|---|---|---|---|
| 7,472,341 B2 * | 12/2008 | Albornoz | G06F 17/241 |
| | | | 715/229 |
| 7,594,163 B2 * | 9/2009 | Slack-Smith | G06F 17/2288 |
| | | | 715/200 |
| 7,594,173 B2 * | 9/2009 | Matsumoto | G06F 21/10 |
| | | | 715/200 |
| 7,761,498 B2 * | 7/2010 | Petry | G06Q 10/107 |
| | | | 709/201 |
| 7,779,353 B2 * | 8/2010 | Grigoriu | G06F 17/2247 |
| | | | 715/243 |
| 7,802,179 B2 * | 9/2010 | Bissonnette | G06F 17/212 |
| | | | 715/229 |
| 7,810,028 B2 * | 10/2010 | Bell | G06Q 10/10 |
| | | | 715/255 |
| 2002/0031209 A1 * | 3/2002 | Smithies | G06Q 20/04 |
| | | | 379/93.12 |
| 2002/0052801 A1 | 5/2002 | Norton et al. | |
| 2002/0174030 A1 | 11/2002 | Praisner et al. | |
| 2003/0001890 A1 * | 1/2003 | Brin | G06F 3/04847 |
| | | | 715/753 |
| 2003/0028494 A1 * | 2/2003 | King | G06F 21/64 |
| | | | 705/71 |
| 2004/0054985 A1 * | 3/2004 | Sewell | G06F 17/30554 |
| | | | 717/109 |
| 2005/0043979 A1 | 2/2005 | Soares et al. | |
| 2008/0189608 A1 * | 8/2008 | Nurmi | G06F 17/2288 |
| | | | 715/273 |
| 2008/0201635 A1 * | 8/2008 | Yamakado | G06F 17/211 |
| | | | 715/256 |
| 2008/0288532 A1 * | 11/2008 | Aboukrat | G06F 17/30011 |
| 2009/0006948 A1 * | 1/2009 | Parker | G06F 3/0483 |
| | | | 715/255 |
| 2009/0217151 A1 * | 8/2009 | Wake | G06F 17/30961 |
| | | | 715/234 |
| 2009/0300471 A1 * | 12/2009 | Dettinger | G06F 17/2247 |
| | | | 715/200 |
| 2009/0327876 A1 * | 12/2009 | Saks | G06F 17/211 |
| | | | 715/256 |
| 2009/0327877 A1 * | 12/2009 | Slaney | G06F 17/2715 |
| | | | 715/256 |
| 2009/0327878 A1 * | 12/2009 | Grandison | G06F 17/30719 |
| | | | 715/256 |

* cited by examiner

US 9,892,092 B2

AUTOMATIC GENERATION OF ASSENT INDICATION IN A DOCUMENT APPROVAL FUNCTION FOR COLLABORATIVE DOCUMENT EDITING

CROSS-REFERENCE TO RELATED APPLICATIONS

This application is a Continuation of U.S. patent application Ser. No. 12/362,222, filed on Jan. 29, 2009, now allowed, which is incorporated herein by reference in its entirety.

BACKGROUND OF THE INVENTION

The present invention broadly relates to the field of document creation and editing and more particularly relates to the field the collaborative composition and approval of a document.

Document creation and editing form the heart of personal productivity in computing. The word processor, the core component of the personal productivity office suite, has enjoyed decades of widespread use with little change in basic functionality only to be complimented by companion components including the spreadsheet application and presentation application. Collaborative computing when merged with document creation and editing functionality forms a powerful automated analog to traditional paper movement in a corporate environment. In this regard, within a collaborative computing environment, a document can be created by one collaborator, edited by multiple other collaborators and approved by all before publication. The process of document creation, editing and approval in a collaborative computing environment has been referred to as a document workflow.

Automating document workflow can be a complex process, requiring substantial logic either embedded within a document editor as in the case of a review and comment function, or more likely, included as part of a document workflow system. Robust document workflow systems provide for a document approval process in which designated collaborators must approve a document prior to publication. Defining the document approval process can be heavyweight in nature and can require a specification not only of those collaborators whose approval is required, but also the timing as to when review and approval of the different collaborators is required.

BRIEF SUMMARY OF THE INVENTION

In an embodiment of the invention, a method for generating an assent indication in a document approval and review function for collaborative document editing can be provided. The method can include loading a document for editing in a document editor and determining a set of authors for the document. The method also can include modifying a title of the document to include an identity of at least one of the authors in the set. Finally, the method can include changing a visual appearance in the title of an identity of the assenting author responsive to one of the authors in the set assenting to a publication of the document.

In another embodiment of the invention, a document editing data processing system can be provided. The system can include a title modification module configured for communicative coupling to a document editor. The module can include program code enabled to determine a set of authors for a document created for editing in the document editor, to modify a title of the document to include an identity of at least one of the authors in the set, and in response to one of the authors in the set assenting to a publication of the document, to change a visual appearance in the title of an identity of the assenting author. In this way, a listing of documents in a user interface can provide a readily apparent indication of documents requiring the assent of a particular author. Further, in that the title of the document provides the required assent indication, existing query mechanisms for querying the titles of documents in a file system can provide an inherent query mechanism for searching documents requiring the assent of a particular author or authors.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention.

DETAILED DESCRIPTION OF THE INVENTION

Figure 1:
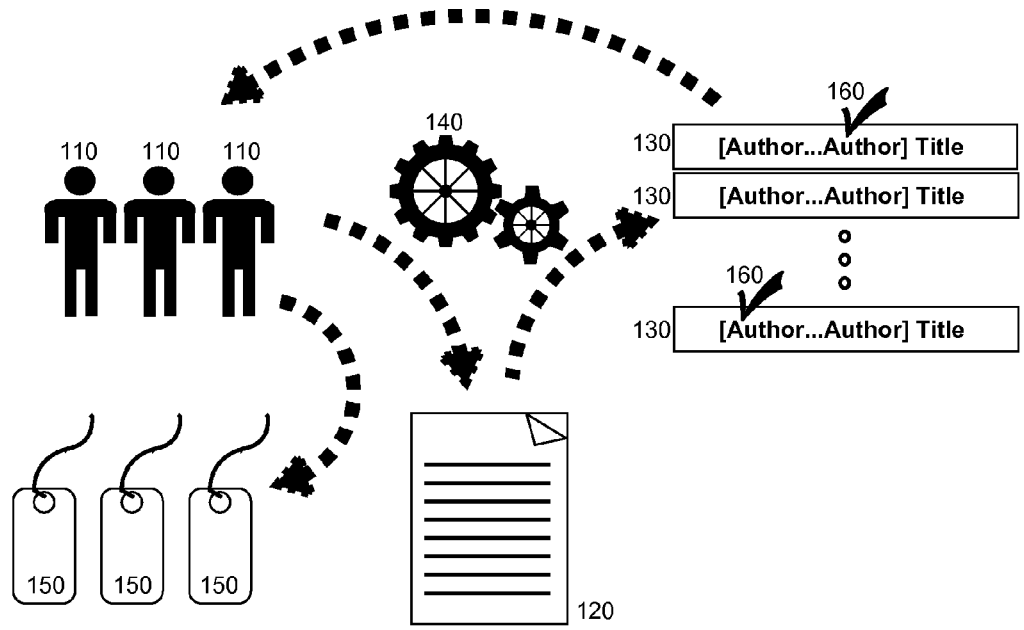
FIG. 1 is a pictorial illustration of a process for generating an assent indication in a document approval and review function for collaborative document editing.

As will be appreciated by one skilled in the art, the present invention may be embodied as a method, data processing system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Embodiments of the invention include a method, data processing system and computer program product for generating an assent indication in a document approval and review function for collaborative document editing can be provided. In an embodiment of the invention, a document title for a document can be modified to reflect an identity for one or more collaborators associated with the document, for example collaborators whom have reviewed or edited the document. As each collaborator identified in the title reviews and approves the document, the title can be modified to indicate that the review and approval of the collaborator no longer is required. Accordingly, a listing of documents by title can indicate those documents requiring the review and approval of a specific one of the collaborators without necessitating complex logic in a document editor and document workflow system.

In further illustration, FIG. 1 pictorially shows a process for generating an assent indication in a document approval and review function for collaborative document editing. As shown in FIG. 1, different authors 110 can be determined for a document 120. The different authors 110 can be determined programmatically by inspecting the identity of collaborators whom have created, accessed or edited the document 120. Alternatively, the authors 110 can be manually specified. In either circumstance, assent indication module 140 can modify the title 130 of the document 120 as an amalgamation of the identity of the authors 110 and a descriptive title of the document 120.

As each of the authors 110 approves the document 120 for publication, the assent indication module 140 can alter the visual appearance of the title 130 to reflect the assent of the approving authors 110. By way of example, the identity of approving ones of the authors 110 can be removed from the title 130, or visually decorated with a decorator 160 such as an icon, font change or highlighting. As yet another alternative, tags 150 can be applied to the title 130 corresponding to the nature of the assent provided by the approving ones of the authors 110. In any case, a viewing one of the authors 110 of a listing of titles 130 for corresponding documents 120 can quickly determine which of the documents 120 require the assent of the viewing one of the authors 110.

Figure 2:
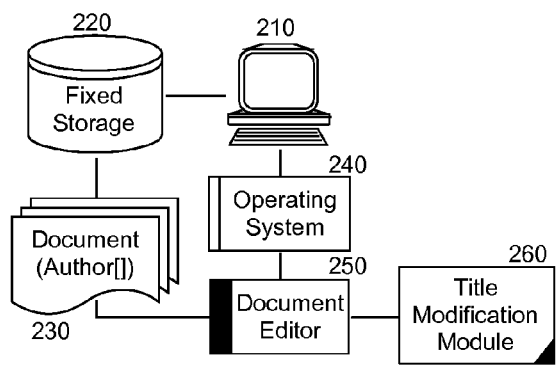
FIG. 2 is a schematic illustration of a document editing data processing system configured for generating an assent indication in a document approval and review function for collaborative document editing; and, FIG. 3 is a flow chart illustrating a process for generating an assent indication in a document approval and review function for collaborative document editing.

The process described in connection with FIG. 1 can be implemented in a document editing data processing system. Specifically, as shown in FIG. 2, the system can include a host computing platform supporting an operating system 240 and including fixed storage 220 in which different documents 230 are stored. The operating system 240 in turn can manage the execution of one or more applications including a document editor 250, for example a word processor, spreadsheet or presentation application. A title modification module 260 can be coupled to the document editor 250, for instance as an external plug-in, library or separate executable. The title modification module 260 can be configured to interact with the document editor 250 in a lightweight fashion, for instance by intercepting and handling operations in the document editor 250 related to the establishment or maintenance of document names for the documents 230. Examples of such operations include document saving, renaming and closing operations.

In this regard, the title modification module 260 can include program code enabled to, when executed in the host computing platform 210, determine the identity of different authors of a document and modify the title of the document to incorporate a listing of one or more of the different authors. The program code of the title modification module 260 further can be enabled to, when executed in the host computing platform 210, detect an indication of assent by one of the different authors and modify the title of the document to indicate the assent. Examples include removing the identity of the author from the title, altering the appearance of the author in the title such as by changing one of a font, font style, font background and font color of the identity of the assenting author in the title, or decorating the identity of the author in the title with an icon. Alternatively, the program code of the title modification module 260 can be enabled to apply a pre-defined or ad hoc tag to the title for the author associated with the assent of the author.

Figure 3:
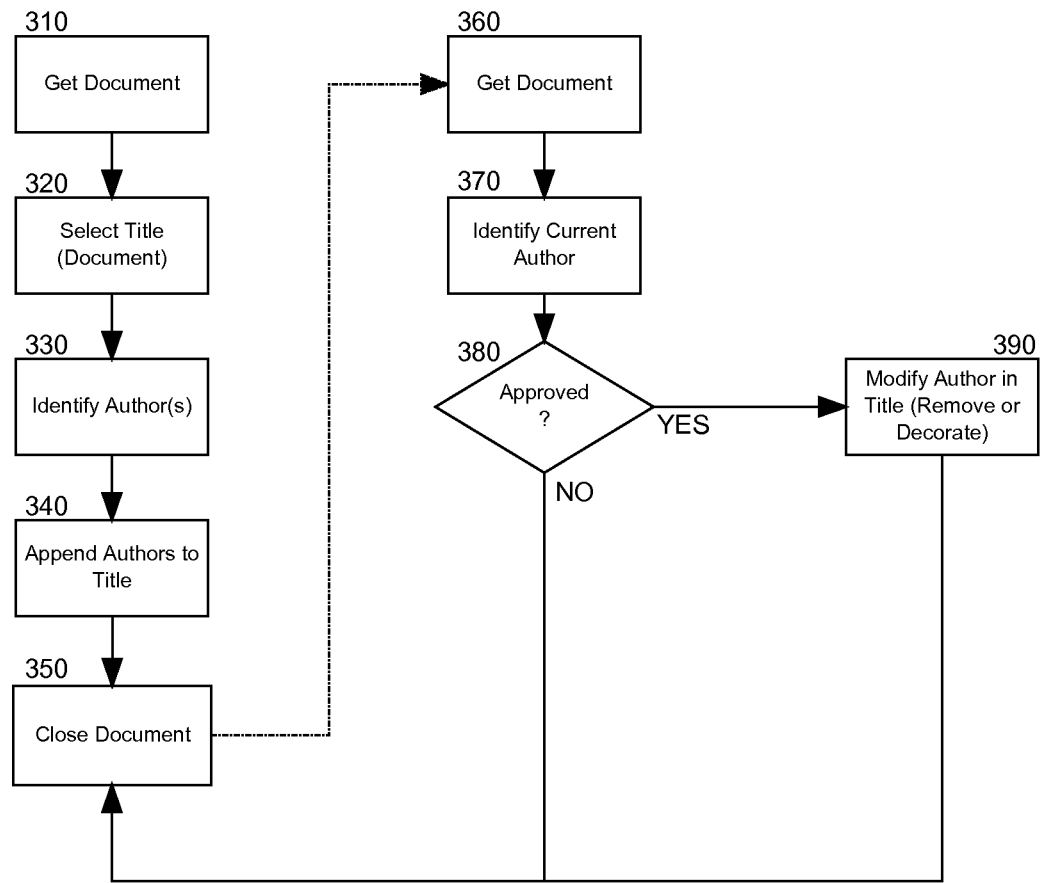

In yet further illustration of the operation of the program code of the title modification module 260, FIG. 3 is a flow chart illustrating a process for generating an assent indication in a document approval and review function for collaborative document editing. The process can begin in block 310 with the creation of a document for editing. In block 320, a title can be selected for the document and in block 330, different authors associated with the document can be determined. In this regard, the different authors can be determined through an inspection of author supplied tags to the document, such as "Author.John" or "Author.Mary". Alternatively, upon loading the document for editing, a dialog box can be presented prompting for a specification of one or more of the different authors. Yet further, the document can be inspected to infer authorship by locating terms like "By:" or "Author" within the document. In block 340, one or more of the different authors can be appended to the title and in block 350 the document can be closed.

Thereafter, in block 360, the document again can be retrieved by one of the different authors. In block 370, the identity of the author retrieving the document can be determined and in block 380, it can be determined whether or not the identified author has assented to the publication of the document. If so, in block 390 the appearance of the title of the document can be modified to reflect the assent of the author, for example by removing the identity of the author from the title, by altering the appearance of the author in the title, or by decorating the identity of the author in the title with an icon. Alternatively, a pre-defined or ad hoc tag can be associated with the title expressing the assent of the author. Finally, in block 350 the document can be closed.

Having thus described the invention of the present application in detail and by reference to embodiments thereof, it will be apparent that modifications and variations are possible without departing from the scope of the invention defined in the appended claims

We claim:

1. A method for generating an assent indication in a document approval and review function for collaborative document editing, the method comprising:

loading into a memory of a computer a document for editing in a document editor;

determining, by the processor of the computer, a set of authors for the document comprising one of inspecting author supplied tags associated with the document, receiving an indication from a user indicating one or more authors of the document, and inspecting the document to infer authorship by locating terms indicating authorship within the document;

modifying, a title of the document, by the processor of the computer, by appending an identity of each author in the determined set of authors to the title of the document; and, responsive to one of the authors in the determined set of authors assenting to a publication of the document, changing a visual appearance in the modified title of an identity of the assenting author by removing the identity of the assenting author from the modified title of the document resulting in leaving the identity of each author in the determined sets authors that has yet to assent to the publication of the document in the modified title of the document.

2. The method of claim 1, wherein receiving the indication from the user indicating one or more authors of the document comprises presenting the user a dialog box prompting for a specification of the one or more authors of the document upon loading the document for editing.

3. The method of claim 1, wherein changing the visual appearance in the modified title of the identity of the assenting author comprises decorating the identity of the assenting author in the modified title with an icon.

4. The method of claim 1, wherein changing the visual appearance in the modified title of the identity of the assenting author comprises changing one of a font, font style, font background and font color of the identity of the assenting author in the modified title.

5. The method of claim 1, further comprising applying a tag to the modified title indicating assent in response to one of the authors in the determined set of authors assenting to the publication of the document.

6. The method of claim 3, wherein the icon is a check mark.

7. A document editing data processing system comprising:
a computer having a memory and at least one processor, the at least one processor configured to
load into a memory of a computer a document for editing in a document editor;
determine a set of authors for the document comprising one of inspecting author supplied tags associated with the document, receiving an indication from a user indicating one or more authors of the document, and inspecting the document to infer authorship by locating terms indicating authorship within the document;
modify a title of the document by appending an identity of each author in the determined set of authors to the title of the document; and,
responsive to one of the authors in the determined set of authors assenting to a publication of the document, change a visual appearance in the modified title of an identity of the assenting author by removing the identity of the assenting author from the modified title of the document resulting in leaving the identity of each author in the determined set of authors that has yet to assent to the publication of the document in the modified title of the document.

8. The document editing data processing of claim 7, wherein the at least one processor configured to receive the indication from the user indicating one or more authors of the document comprises the at least one processor being configured to present the user a dialog box prompting for a specification of the one or more authors of the document upon loading the document for editing.

9. The document editing data processing of claim 7, wherein the at least one processor configured to change the visual appearance in the modified title of the identity of the assenting author comprises the at least one processor being configured to decorate the identity of the assenting author in the modified title with an icon.

10. The document editing data processing of claim 7, wherein the at least one processor configured to change the visual appearance in the modified title of the identity of the assenting author comprises the at least one processor being configured to change one of a font, font style, font background and font color of the identity of the assenting author in the modified title.

11. The document editing data processing of claim 7, wherein the at least one processor is further configured to apply a tag to the modified title indicating assent in response to one of the authors in the determined set of authors assenting to the publication of the document.

12. The document editing data processing of claim 9, wherein the icon is a check mark.

13. A computer program product for generating an assent indication in a document approval and review function for collaborative document editing, the computer program product comprising:
a non-transitory computer usable storage medium having computer usable program code embodied therewith, the computer usable program code comprising:
computer usable program code for loading into a memory of a computer a document for editing in a document editor;
computer usable program code for determining a set of authors for the document comprising one of inspecting author supplied tags associated with the document, receiving an indication from a user indicating one or more authors of the document, and inspecting the document to infer authorship by locating terms indicating authorship within the document;
computer usable program code for modifying, a title of the document, by appending an identity of each author in the determined set of authors to the title of the document; and,
computer usable program code for, responsive to one of the authors in the determined set of authors assenting to a publication of the document, changing a visual appearance in the modified title of an identity of the assenting author by removing the identity of the assenting author from the modified title of the document resulting in leaving the identity of each author in the determined set of authors that has yet to assent to the publication of the document in the modified title of the document.

14. The computer program product of claim 13, wherein the computer usable program code for receiving the indication from the user indicating one or more authors of the document comprises computer usable program code for presenting the user a dialog box prompting for a specification of the one or more authors of the document upon loading the document for editing.

15. The computer program product of claim 13, wherein the computer usable program code for changing the visual appearance in the modified title of the identity of the assenting author comprises computer usable program code for decorating the identity of the assenting author in the modified title with an icon.

16. The computer program product of claim 13, wherein the computer usable program code for changing the visual appearance in the modified title of the identity of the assenting author comprises computer usable program code for changing one of a font, font style, font background and font color of the identity of the assenting author in the modified title.

17. The computer program product of claim 13, further comprising computer usable program code for applying a tag to the modified title indicating assent in response to one of the authors in the determined set of authors assenting to the publication of the document.

* * * * *